UNITED STATES PATENT OFFICE.

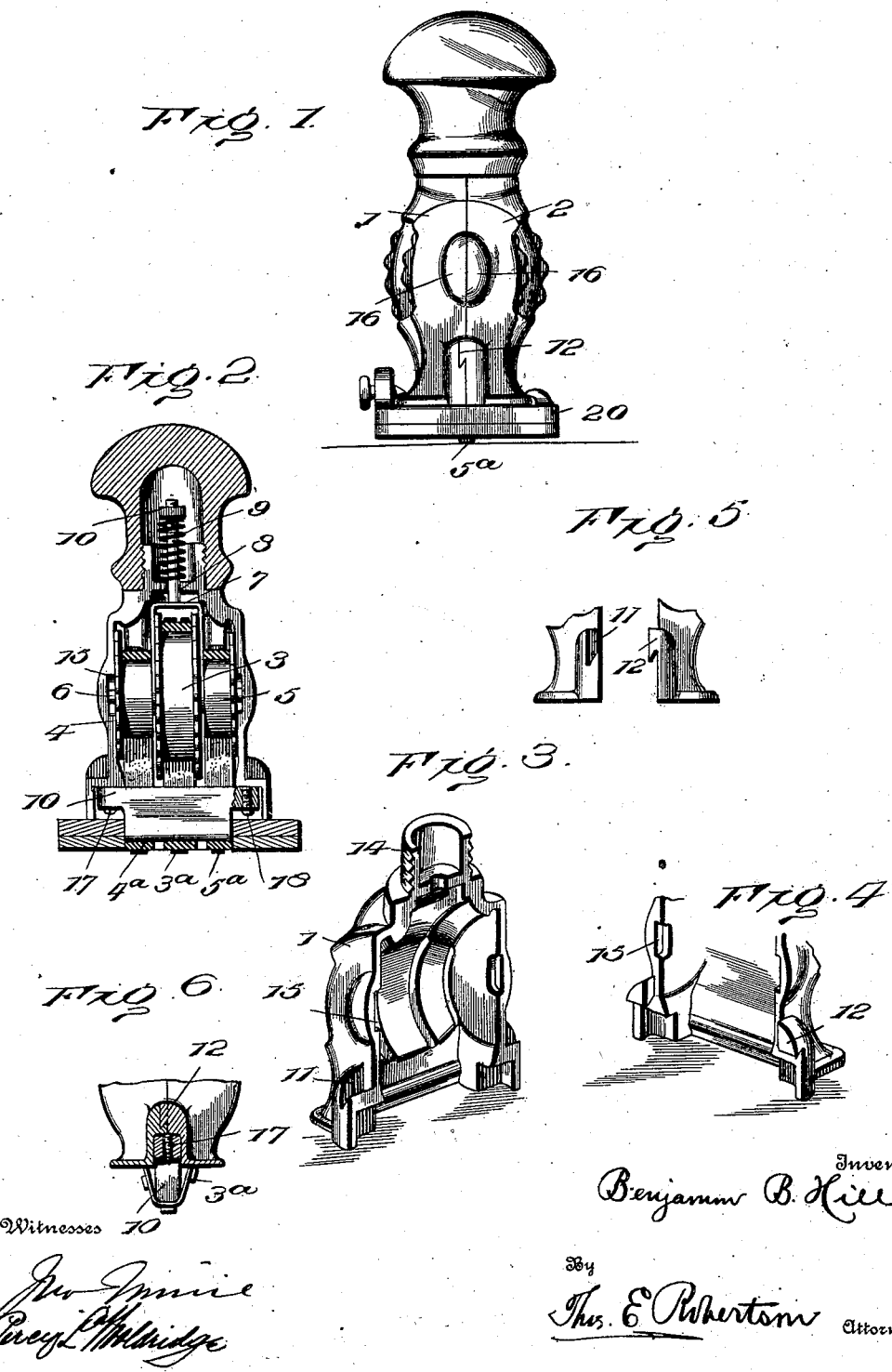

BENJAMIN B. HILL, OF PHILADELPHIA, PENNSYLVANIA.

HAND-STAMP.

SPECIFICATION forming part of Letters Patent No. 722,707, dated March 17, 1903.

Application filed May 31, 1902. Serial No. 109,739. (No model.)

*To all whom it may concern:*

Be it known that I, BENJAMIN B. HILL, a citizen of the United States of America, and a resident of Philadelphia, in the county of Philadelphia and State of Pennsylvania, have invented certain new and useful Improvements in Hand-Stamps, of which the following is a specification.

This invention relates to an improvement in that type of hand-stamps shown in my United States Patent No. 344,903, granted July 6, 1886, which consists of two main metallic parts inclosing the printing characters made in the form of drums, the two main parts being held around the printing characters by means of a handle at one end and a removable inscription-plate at the opposite end.

The object of my present invention is to improve the details of said stamp and at the same time to make a more serviceable stamp which shall be cheap to manufacture and not likely to get out of order.

My invention therefore consists of a stamp of the type shown in the accompanying drawings and in the peculiar construction and arrangement of parts, as hereinafter more particularly described and then definitely claimed.

In the accompanying drawings, forming a part of this application, Figure 1 is an end elevation of my improved stamp. Fig. 2 is a vertical section taken at right angles to the view shown in Fig. 2. Fig. 3 is a perspective view of one of the two parts of the shell or casing looking at the interior. Fig. 4 is a detail of the lower portion of the opposite half of the shell or casing. Fig. 5 is a detail showing the lower portions of the two halves detached. Fig. 6 is a detail showing the lower parts assembled.

Referring now to the details of the drawings by numerals, 1 and 2 indicate the two main parts of the shell or casing of the general type of those shown in my aforesaid patent, but with changes, as will be hereinafter described. These two main parts inclose a central drum 3, which supports a "day-band" 3ª, and two side drums 4 and 5, on which rotate "month" and "year" bands 4ª and 5ª, all three drums being journaled on the axle-pin 6. A yoke 7 is also connected with the axle-pin 6 and has connected thereto at its upper end a spindle 8, on which is placed a coiled spring 9 and a screw-threaded nut 10, all as clearly seen in Fig. 2. At their lower ends the bands travel around a bridge 10, which projects through an opening left between the two halves of the shell or casing.

All the parts so far described may be made like the corresponding parts of my aforesaid patent, and therefore need no further description.

The main point of my present invention consists in forming the two parts 1 and 2 of the shell or casing with self-locking parts which do not rely on the inscription-plate to hold the parts together. To this end I form each side of the part 1 with a recess 11 (see especially Figs. 3 and 5) and the opposite part 2 with coacting dovetailed parts 12, which recesses and the parts 12 are formed so that when the parts are slid downward into the recesses, as seen in Figs 1 and 6, it will be impossible on account of the dovetailed shape to move them laterally and separate them. It is obvious, therefore, that when the axle-pin 6 and its drums and bands and the type-bridge 10 are inserted loosely in one half—say the part 1—and the other half 2 is placed alongside of the companion part and slid downward until the part 12 fills the recess 11 it is only necessary to secure the upper ends of the two parts 1 and 2 to have the parts firmly held in position. Before securing the upper ends, however, I screw down the adjusting-nut 10 until the desired pressure is placed on the bands, and after this adjustment is made the head or handle 13 may be screwed onto the top ends 14 of the parts 1 and 2 and these parts thus held together with the interior parts in proper working condition. Instead of forming the two main parts 1 and 2 with a slot which is exposed on the outside, as in my aforesaid patent, I form a groove or channel 15 in each side of each of the parts 1 and 2, as seen in Figs 1, 3, and 4, so that there is thickness of metal 16 on the outside of this groove or channel, which hides it from view, as seen in Fig. 1, and thus prevents the accumulation of dirt and also forms a much prettier stamp.

Another improvement over my former stamp is that the screws 17 and 18, which are used for adjusting the type-bridge 10, are inserted through the bridge and bear on the lower walls of the main parts 1 and 2 immediately under the recess 11 and its coacting part 12. With this construction the screws perform the double function of permitting the adjustment of the type-bridge as occasion may require and, if the part 12 is not fully seated in the recess 11, to push upwardly on the part 1, and thus hold the parts firmly locked together. This action does not take place when the parts are in the position shown in Fig. 2, as the type-bridge itself is drawn upward by the tension of the spring 9 and holds the two parts together; but when it is necessary to adjust the type-bridge the latter of course is moved downward by turning the screws 17 and 18, and the screws are then in the proper position to assist in holding the parts in position. It would be sufficient if the screws 17 contacted only with the part containing the recess 11, as will be evident from an inspection of Fig. 6. After the parts are all in position the inscription-plate 20 may be fastened on, as in my aforesaid stamp; but in the present stamp the inscription-plate is not needed to hold the main parts of the shell or casing together, and it is therefore possible when it is desired to print merely the date to remove this inscription-plate and use the stamp as a dating-stamp without running the risk of the parts falling away from each other.

It will thus be seen that I have invented an improved stamp in which the two parts forming the shell or casing come as near as it is possible to holding themselves together without the aid of exterior screws or other devices and that the stamp is entirely closed, with the exception of the slots where the bands project at the bottom and where the turning devices for the drums project through the casing. Thus all the interior screws are completely hidden from view.

What I claim as new is—

1. In a hand-stamp and in combination with the drums and bands thereof, a shell or casing for containing said drums and bands comprising two main sections provided with interlocking parts, one of said parts sliding in the other to effect the locking engagement of said sections, and means for holding said interlocking parts together, substantially as described.

2. In a hand-stamp and in combination with the drums and bands thereof, a shell or casing for containing said drums and bands, comprising two main sections, one of said sections having a recess and the other section an interlocking projecting part coacting with said recess, and means for holding said interlocking projecting part in the recess of the other section, substantially as described.

3. In a hand-stamp, a shell or casing for containing the printing characters comprising two sections, one of said sections having a recess and the other section an interlocking projection coacting with said recess, said parts thus detachably locking the two main sections together, a type-bridge supported in a recess under said interlocking parts, and a spring connection drawing said type-bridge upward, and also holding the interlocking projection in its recess, substantially as described.

4. In a hand-stamp, a shell or casing for containing the printing characters comprising two sections, one of said sections having a recess and the other section an interlocking projection coacting with said recess, said parts thus detachably locking the two main sections together, a type-bridge supported in a recess under said interlocking parts, adjusting-screws passing through said bridge and tending to prevent said interlocking parts from separating, and a spring connection for drawing the type-bridge and its screws upward, substantially as described.

5. As a new article of manufacture, a casting for a hand-stamp casing comprising an opening to hold the type-drums and axle-pin thereof, a groove or channel in said casting for permitting an adjusting movement of the axle-pin, the casting being formed to cover said groove or channel on its exterior and thereby hide it from view, substantially as described.

6. A hand-stamp casing comprising two sections provided with self-locking parts, said parts having a groove or channel formed at their uniting edges and having a covering formed over the exterior of said groove or channel and thereby hiding the latter from view and preventing the accumulation of dirt, substantially as described.

Signed by me at Philadelphia, Pennsylvania, this 27th day of May, 1902.

BENJAMIN B. HILL.

Witnesses:
JOHN M. SNYDER,
HENRY F. BAUER.